O. CARRASCO.
DEVICE FOR TESTING PRESERVED FOODS.
APPLICATION FILED JAN. 16, 1922.
1,434,771.
Patented Nov. 7, 1922.
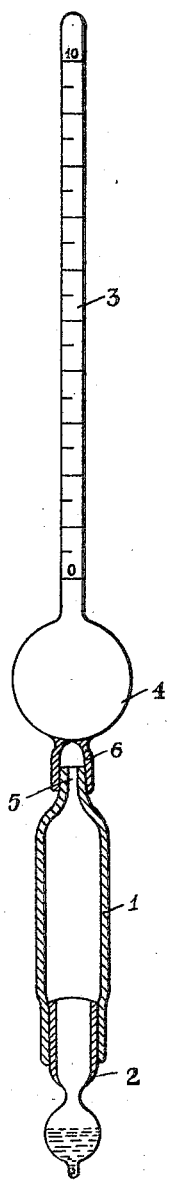
Inventor
Oreste Carrasco
per Haseltine Lan Ro
Attorneys Patented Nov. 7, 1922.

1,434,771

UNITED STATES PATENT OFFICE.

ORESTE CARRASCO, OF ST. GIOVANNI DI TEDUCCIO, NEAR NAPLES, ITALY, ASSIGNOR TO SOCIETE GENERALE DELLE CONSERVE ALIMENTARI CIRIO, OF ST. GIOVANNI DI TEDUCCIO, NEAR NAPLES, ITALY.

DEVICE FOR TESTING PRESERVED FOODS.

Application filed January 16, 1922. Serial No. 529,637.

*To all whom it may concern:*

Be it known that I, Dr. ORESTE CARRASCO, technical manager with The Società "Cirio" at St. Giovanni di Teduccio, residing at St. Giovanni di Teduccio, near Naples, Italy, of Italian nationality, have invented certain new and useful Improvements in Devices for Testing Preserved Foods, of which the following is a specification.

In connection with preserved foods, especially tomato preserves, jams, marmalades and the like, it is indispensable for the control of production, and for the guarantees required in sale and purchase contracts, to make long and costly chemical analyses with a view to determining the alimentary value of the preserve, which value is a function of the dry residue and of the sugar percentage it contains.

These factors being in close relationship with the true density, the rapid determination of this physical fact is of unusual value, especially in connection with industrial purposes for which immediate results, even if approximative, are necessary.

The aeropicnometer forming the subject matter of the invention is shown in elevation in the accompanying drawing. The device serves precisely for the purpose hereinbefore specified, and it is the first apparatus of its kind which is adapted to obtain practical and immediate results.

This aeropicnometer consists of three distinct parts, each made of glass, which can be easily and precisely assembled. These parts consist of a central cylindrical reservoir 1 having the most suitable form for being filled by the products of paste-like consistency, a weighted or balanced stopper 2 and a column 3 graduated from 0 to 10 and provided with a thrust bulb or float 4.

The reservoir 1, closed by ground glass stopper 2 forms the picnometer properly so-called which has, for example, a capacity of 25 cubic centimetres and which, being joined at its upper end, by means of the small ground glass stem 5, to the lower appendix 6 of the bulb 4, sinks more or less when immersed in water according to the greater or lesser density of the substance with which it has been filled.

In view of the nature of the substances which it is intended to measure the graduation of the device can only be conventional, but it has been thought advisable to make it refer to solutions of sugar (saccharose) because the concentrations, at a parity of density, approach closest to the dry residue of good preserves of tomatoes. The said graduation is effected in such a manner that, on filling the picnometer with distilled water, and immersing the apparatus in the water itself it dips into it to the point where the graduation zero is marked, and when filled with a solution with 50 per cent sugar (density of 1.233) the picnometer on being immersed in water dips therein to the level of the graduation 10. The space between these two points is divided into ten equal parts, so that to these divisions there corresponds sugar solutions having a concentration varying from 5 per cent to 50 per cent progressively.

In establishing the graduation no consideration need be given to the correction of the amplitudes of the degrees for compensating the ascensional force, which is variable according to the maximum or minimum immersion of the graduated rod because, in view of the diameter of this latter, the high volume and the absolute weight of the apparatus, the resulting difference can be neglected, as in the same way there must be regarded as negligible the variations which occur when the distilled water, in which the apparatus is immersed, is substituted by ordinary potable water.

The upper limit of the scale, corresponding to the graduation 10 has been fixed by practice because of a greater density than that represented by this limit for a tomato preserve of the normal type is unusual.

This aeropicnometer is preferably graduated at a temperature of 20° centigrade, because this is the temperature of the water which is generally at hand during the process of preparing the tomato preserve.

The graduation of the device may be varied so that with suitable modifications of weight and volume it may be used for measuring the density of industrial products which, owing to their physical and chemical properties (viscosity suppleness and smoothness) cannot be tested by common densimeters or aerometers.

What I claim and desire to secure by Letters Patent of the United States is:—

An aeropicnometer for testing preserved foods particularly tomato preserves, jams, marmalades and the like comprising a central cylindrical reservoir for the product to be tested closed at one end, a weighted removable stopper at the other end of said reservoir and a graduated column provided with a float having an appendix for removable attachment to the closed end of said reservoir.

Dr. ORESTE CARRASCO.